US009629180B2

(12) United States Patent
Ma et al.

(10) Patent No.: US 9,629,180 B2
(45) Date of Patent: Apr. 18, 2017

(54) METHOD AND APPARATUS FOR TRANSMITTING AND OBTAINING SCHEDULING INFORMATION

(71) Applicant: Huawei Technologies Co., Ltd., Shenzhen (CN)

(72) Inventors: Sha Ma, Beijing (CN); Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 14/189,579

(22) Filed: Feb. 25, 2014

(65) Prior Publication Data

US 2014/0177564 A1 Jun. 26, 2014

Related U.S. Application Data

(63) Continuation of application No. PCT/CN2012/079980, filed on Aug. 10, 2012.

(30) Foreign Application Priority Data

Aug. 25, 2011 (CN) .......................... 2011 1 0246664

(51) Int. Cl.
*H04W 74/04* (2009.01)
*H04W 72/12* (2009.01)
*H04W 76/02* (2009.01)

(52) U.S. Cl.
CPC ....... *H04W 74/04* (2013.01); *H04W 72/1289* (2013.01); *H04W 76/023* (2013.01)

(58) Field of Classification Search
CPC .......... H04Q 7/22; H04W 4/06; H04W 72/04; H04W 74/04; H04W 76/023; G06F 11/3006; G06F 15/173; H04L 5/007
See application file for complete search history.

(56) References Cited

U.S. PATENT DOCUMENTS 7,475,134 B2 * 1/2009 Cook .................. G06F 11/3006
709/213
2006/0079240 A1 4/2006 Fitzek et al.
(Continued)

FOREIGN PATENT DOCUMENTS

CN 101248597 A 8/2008
CN 101867978 A 10/2010
(Continued)

OTHER PUBLICATIONS

Extended European Search Report received in EP 12 82 5858, mailed Jun. 6, 2014, 8 pages.
(Continued)

*Primary Examiner* — Andrew Lai
*Assistant Examiner* — Leon Andrews
(74) *Attorney, Agent, or Firm* — Slater Matsil, LLP

(57) ABSTRACT

A method for transmitting scheduling information includes determining user equipments (UEs) performing direct communication and scheduling information required for data transmission for the UEs performing the direct communication. A base station transmits invariable or slowly varying control information in the scheduling information to each of the UEs performing the direct communication statically or semi-statically. The scheduling information further includes quickly varying control information. A UE serving as a sender in the UEs performing the direct communication transmits the quickly varying control information in the scheduling information dynamically or semi-dynamically to a UE serving as a receiver in the UEs performing the direct communication.

21 Claims, 4 Drawing Sheets

(56) References Cited

U.S. PATENT DOCUMENTS

2008/0299955 A1* 12/2008 Lee .................. H04W 4/06
                                                 455/414.1
2012/0155416 A1   6/2012 Zhang et al.
2015/0071189 A1*  3/2015 Park ................ H04W 76/023
                                                 370/329

FOREIGN PATENT DOCUMENTS

| CN | 102014508 A   | 4/2011 |
| WO | 2010049801 A1 | 5/2010 |
| WO | 2011050519 A1 | 5/2011 |
| WO | 2011051745 A1 | 5/2011 |

OTHER PUBLICATIONS

International Search Report received in PCT/CN2012/079980, mailed Nov. 15, 2012, 10 pages.

* cited by examiner

METHOD AND APPARATUS FOR TRANSMITTING AND OBTAINING SCHEDULING INFORMATION

This application is a continuation of International Application No. PCT/CN2012/079980, filed on Aug. 10, 2012, which claims priority to Chinese Patent Application No. 201110246664.2, filed on Aug. 25, 2011, both of which are hereby incorporated by reference in their entireties.

TECHNICAL FIELD

The present invention relates to the field of radio communications technologies, and in particular, to a method and an apparatus for transmitting and obtaining scheduling information.

BACKGROUND

In a radio communications system, when two user equipments (UE) need to communicate with each other, a sending UE generally needs to transmit data to a base station first, and then the base station transmits the data, which is received from the sending UE, to a receiving UE through a network. Resources required for the sending UE and the receiving UE to send or receive the data may be allocated by the base station. Specifically, before the sending UE sends information or before the receiving UE receives information, the base station indicates control information to the user equipment over a control channel (for example, in an LTE system, a physical downlink control channel (PDCCH)), where the control information includes resource allocation information, a modulation coding scheme, a new data indication, a power control indication, a frequency hopping indication, a precoding matrix indication, and a HARQ process indication. The UE transmits or receives data in a corresponding format on a corresponding resource according to indication information borne on the control channel.

With rapid development of information technologies, a capacity of a communications system needs to be further enhanced to meet high-speed service requirements of the UE. For example, data can be directly transmitted between UEs that are close to each other, which avoids the trouble that the sending UE transmits the data to the base station first and then the base station transmits the data to the receiving UE through a network. That further reduces resource overhead between the UE and the base station.

When direct communication is performed between the UEs, the sending UE and receiving UE also need to use transmission resources in the network when sending or receiving the data. In the prior art, either the UE itself determines available resources through sensing (the sending UE may determine the available resources through sensing and then notify them to the receiving UE; or the sending UE and the receiving UE negotiate to determine the available resources through joint sensing), or the base station or the network allocates available (or potentially available) transmission resources by sending control information to UEs performing direct communication.

However, if the UE senses the available resources by itself, the base station cannot control resource usage of the UE. In addition, because the UE cannot comprehensively understand conditions of other UEs in the network, serious interference may be caused onto communications links of other UEs. If the base station allocates the transmission resources to the UE, the base station can allocate the most suitable resources to the UE and determine proper transmit power according to distribution of UEs in the network, service requirements of the UEs, channel conditions of the UEs, network load, and other factors, and the interference caused by a communications link between the UEs onto a communications link between the base station and other UEs can be controlled by the base station or the network, which prevents the UEs performing direct communication from causing serious interference onto the communications links between the base station and other UEs. However, because the control information generally includes some dynamic (frequently changing) information, the base station generally needs to send the control information to the UE at a very high frequency, which leads to large overhead of transmitting the control information.

SUMMARY OF THE INVENTION

The present invention provides a method and an apparatus for transmitting and obtaining scheduling information to prevent UEs performing direct communication from causing serious interference onto other UEs and reduce resource overhead consumed when a base station transmits scheduling information.

A method for transmitting scheduling information includes determining user equipments UEs performing direct communication and determining scheduling information required for data transmission for the UEs performing the direct communication. A base station transmits invariable or slowly varying control information in the scheduling information to each of the UEs performing the direct communication statically or semi-statically. If the scheduling information further includes quickly varying control information, a UE serving as a sender in the UEs performing the direct communication transmits the quickly varying control information in the scheduling information dynamically or semi-dynamically to a UE serving as a receiver in the UEs performing the direct communication.

A method for obtaining scheduling information includes. Learning user equipments UEs performing direct communication and obtaining invariable or slowly varying control information in the scheduling information transmitted statically or semi-statically by a base station. If the scheduling information further includes quickly varying control information, the quickly varying control information in the scheduling information is exchanged dynamically or semi-dynamically with other UEs that participate in the direct communication.

An apparatus for transmitting scheduling information includes a UE determining unit, which configured to determine user equipments UEs performing direct communication. A scheduling information determining unit is configured to determine scheduling information required for data transmission for the UEs performing the direct communication. A scheduling information transmitting unit is configured for a base station to transmit invariable or slowly varying control information in the scheduling information to each of the UEs performing the direct communication statically or semi-statically. A scheduling information direct exchanging unit is configured for a UE serving as a sender in the UEs performing the direct communication to: if the scheduling information further includes quickly varying control information, transmit the quickly varying control information in the scheduling information dynamically or semi-dynamically to a UE serving as a receiver in the UEs performing the direct communication.

An apparatus for obtaining scheduling information includes a number of units. A learning unit is configured to learn user equipments UEs performing direct communication. A scheduling information receiving unit is configured to obtain invariable or slowly varying control information in the scheduling information transmitted statically or semi-statically by a base station. A scheduling information direct exchanging unit is configured to, if the scheduling information further includes quickly varying control information, exchange the quickly varying control information in the scheduling information dynamically or semi-dynamically with other UEs that participate in the direct communication.

In embodiments of the present invention, the base station may transmit the invariable or slowly varying part in the scheduling information statically or semi-statically to the UEs that participate in the direct communication. If the scheduling information further includes a quickly varying part, direct exchange can be performed dynamically or semi-dynamically between the UEs that participate in the direct communication. In this way, on one hand, because the invariable or slowly varying information is allocated by the base station, serious interference caused onto other UEs in the network can be avoided. On the other hand, because the base station needs only to perform sending statically or semi-statically, resource overhead consumed for transmitting the scheduling information can be reduced. In addition, because the quickly varying part in the scheduling information can be exchanged directly between the UEs dynamically or semi-dynamically, it can be ensured that the quickly varying part of the control information can be updated at a frequency that is high enough.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
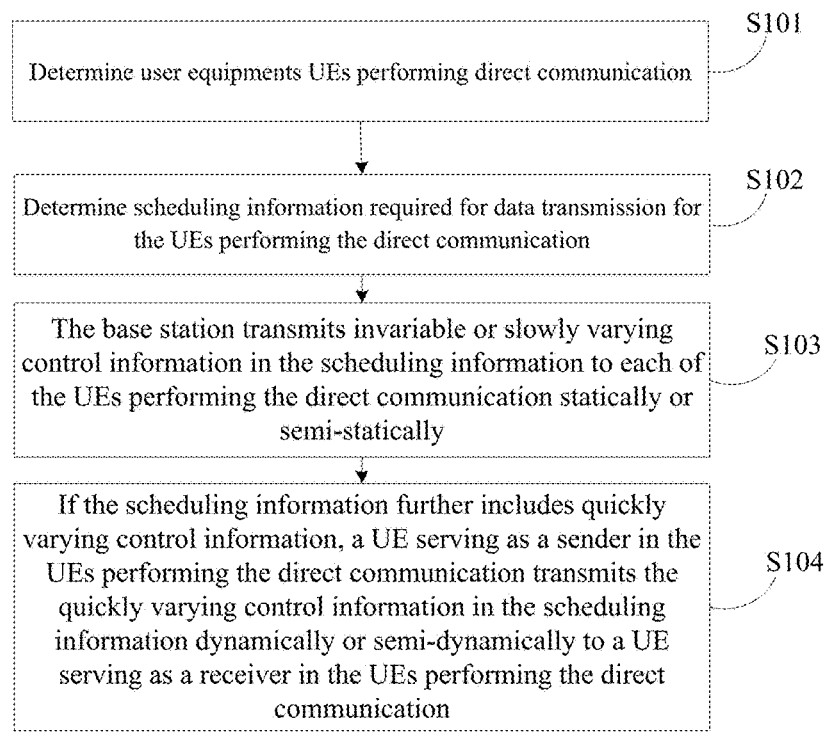
FIG. 1 is a flowchart of a method for transmitting scheduling information according to an embodiment of the present invention.

Referring to FIG. 1, first, an embodiment of the present invention provides a method for transmitting scheduling information. The method is applicable to a base station or a network side, and includes the following steps.

S101. Determine user equipments UEs performing direct communication.

When data needs to be transmitted between the UEs in a system, a base station may determine according to factors such as a distance between the UEs whether direct communication can be performed between the UEs.

S102. Determine scheduling information required for data transmission for the UEs performing the direct communication.

After determining that the direct communication can be performed between a sending UE and a receiving UE, the base station may allocate the scheduling information to the UEs that are about to perform the direct communication, where the scheduling information is required for transmitting data. Specifically, the scheduling information may include resource allocation information, a modulation coding scheme, a new data indication, a power control indication, a frequency hopping indication, a precoding matrix indication, a HARQ process indication, and so on. As regards how the scheduling information is specifically allocated, a method in the prior art may be applied, and no detailed description is given here any further.

S103. The base station transmits invariable or slowly varying control information in the scheduling information to each of the UEs performing the direct communication statically or semi-statically.

S104. If the scheduling information further includes quickly varying control information, a UE serving as a sender in the UEs performing the direct communication transmits the quickly varying control information in the scheduling information dynamically or semi-dynamically to a UE serving as a receiver in the UEs performing the direct communication.

The scheduling information may include information updated at a high frequency (which, for ease of description, is briefly known as "quickly varying" in the present invention), and therefore, a general practice in the prior art is that all scheduling information is sent dynamically. However, in the process of implementing the present invention, the inventor finds that because the UEs performing the direct communication are generally characterized by a short distance, low mobility, and so on, the scheduling information required for transmitting data generally includes invariable information or information updated at a very low frequency (which, for ease of description, is briefly known as "slowly varying" in the present invention), or it is even possible that all scheduling information is invariable or slowly varying. If the invariable or slowly varying information is sent to each UE uniformly in a dynamic manner, the same information content is sent repeatedly, which obviously wastes transmission resources of the base station. Therefore, in the embodiment of the present invention, the base station may send the invariable or slowly varying information existing in the scheduling information to the UE statically or semi-statically.

In this way, if all of the scheduling information is invariable or slowly varying information, the UE can transmit and receive the data by directly using the scheduling information sent statically or semi-statically by the base station or a network. However, if only a part of the scheduling information is invariable or slowly varying information, and the other part is quickly varying information, the base station or the network can still transmit the part of invariable or slowly varying information to the UE statically or semi-statically, and the sending UE can transmit the remaining quickly varying information to the receiving UE directly.

Figure 2:
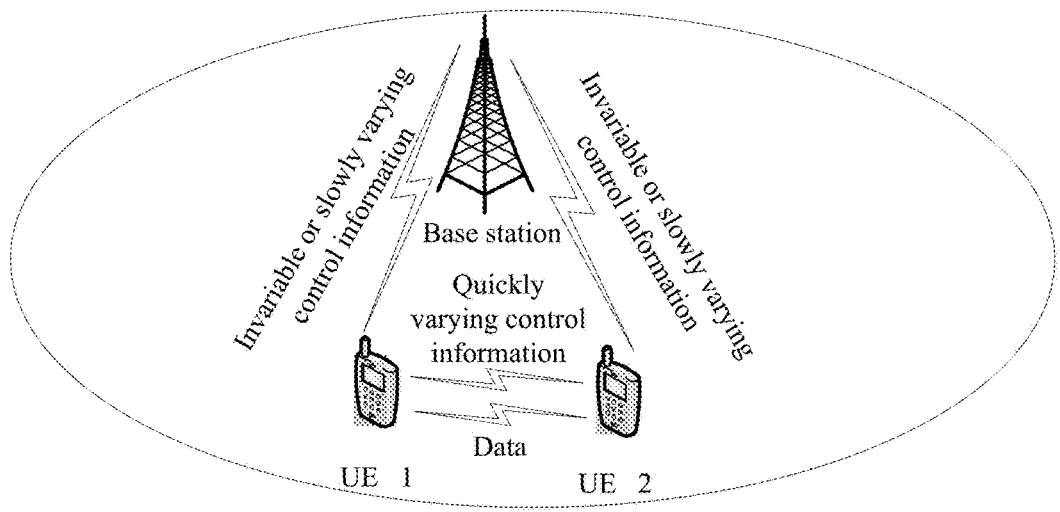
FIG. 2 is a schematic diagram of a method for transmitting scheduling information according to an embodiment of the present invention.

The UEs may transmit and receive data by using the scheduling information received from the base station and the scheduling information obtained through direct exchange between the UEs. For example, information indicating resources required for service transmission of the UE and scheduling information such as a parameter for controlling transmit power of the UE are generally invariable or slowly varying, which therefore can be transmitted by the base station to the UE statically or semi-statically. However, a channel status may change frequently in a transmission process, and it is necessary to dynamically adjust the modulation coding scheme, the precoding matrix, and so on. In this case, such information becomes quickly varying information, and may be transmitted by the sending UE to the receiving UE directly, as shown in FIG. 2 (which uses only one pair of UEs performing the direct communication as an example).

The scheduling signal sent by the base station statically or semi-statically may be sent periodically or aperiodically. If the scheduling information is sent periodically, in order to reduce overhead consumed by the UE in intercepting a downlink control channel and save power of the UE, the base station may predefine a period of sending the scheduling information and notify the period to the UE. In this way, the UE intercepts the downlink control channel according to the period. The period of the base station transmitting the scheduling information may be determined in multiple manners (for example, radio resource control RRC layer signaling, or Media Access Control MAC layer signaling, or physical layer signaling is used to notify relevant parameter configurations required for periodic transmission of the invariable or slowly varying scheduling information, where the relevant parameter configurations include a transmission period, a transmission start time point, and so on).

For example, one of the manners may be to use the start point and the period, that is, the base station determines the start time point and the period of transmitting the invariable or slowly varying information for the UE. For example, the start time point of transmitting the invariable or slowly varying information, which is determined by the base station for the UE, is subframe_offset, and the period is T subframes, which means that subframes such as subframe_offset, subframe_offset+T, and subframe_offset+2T may be subframes for the base station to transmit the invariable or slowly varying information to the UE, and the UE needs only to perform interception on such subframes and does not need to perform interception in other time segments.

Another manner may be a rule determining method, that is, the base station may determine a rule, and, determine, according to the rule, a time point of transmitting the invariable or slowly varying information for the UE. Specifically, different rules may be defined according to actual conditions. For example, the time of transmitting the invariable or slowly varying information may be determined according to a rule similar to a rule of determining a paging subframe or according to certain parameters (such as a UE identifier, or a resource identifier, or a link identifier, and so on), and determined according to a specific rule. Specifically, the subframe time of transmitting the invariable or slowly varying information may be determined according to the following relational expression:

the subframe time of transmitting the invariable or slowly varying information mod N=the UE identifier or the resource identifier or the link identifier where N is a known positive integer.

The UEs are categorized into a sending UE and a receiving UE, and therefore, in order to send data, the sending UE needs to obtain the scheduling information required for sending the data, and use the scheduling information to send the data to the receiving UE, where the scheduling information includes resources used for sending the data, a modulation coding scheme, and so on. Likewise, in order to receive the data from the sending UE correctly, the receiving UE also needs to learn resources used for receiving the data, the modulation coding scheme used by the sending UE, and so on, use the scheduling information to receive the data from the sending UE and perform operations such as correct decoding. Therefore, when the sending UE and the receiving UE are already determined, the base station may transmit the scheduling information to the sending UE and the receiving UE separately, so as to indicate the scheduling information required when the sending UE sends the data.

When the scheduling information is transmitted to the sending UE, an identifier of the sending UE may be used to scramble the scheduling information, and then the scrambled scheduling information is sent over the downlink control channel. Correspondingly, after using its own identifier to descramble the intercepted control channel information, the sending UE can obtain the scheduling information allocated by the base station to the sending UE. Similarly, the base station may also use the identifier of the receiving UE to scramble the scheduling information, and, after using its own identifier to descramble the information on the control channel, the receiving UE can obtain the scheduling information allocated by the base station to the receiving UE.

In the foregoing method, it is assumed that the sending UE is UE 1 and the receiving UE is UE 2, the base station needs to send the scheduling information to the UE 1 and the UE 2 once separately after allocating the scheduling information to the UE 1, where the scheduling information is used for the UE 1 to send data. However, because the scheduling information required for the sending UE to send the data generally corresponds to the scheduling information required for the receiving UE to receive the data, when the scheduling information is sent to the sending UE and the receiving UE separately, the content of the scheduling information is basically the same (in fact, both the content of the scheduling information sent to the sending UE and the content of the scheduling information sent to the receiving UE indicate the scheduling information used when the sending UE sends the data).

Obviously, that is a waste of overhead of resources used for transmitting the scheduling information. Therefore, another method for transmitting scheduling information is provided in an embodiment of the present invention. In this method, for each UE performing the direct communication, a base station may send only one copy of scheduling information to a specific UE, where the scheduling information is allocated to the UE and used for the UE to send data. By detecting a control channel that bears the scheduling information, each UE performing the direct communication simultaneously obtains the scheduling information allocated by the base station to the UE.

In practical implementation, after determining the UEs that can perform the direct communication, first of all, the base station may allocate a same identifier (such as identifier A) to the UEs performing the direct communication, and notify the identifier to the UEs performing the direct communication. There are many specific notification manners. For example, by using RRC (radio resource control) signaling, or MAC (Media Access Control) signaling, or a random access response, or another response message sent by the base station to the UE, the identifier A may be notified to the UEs performing the direct communication. After receiving the identifier A, the UEs performing the direct communication can know that the identifier A can be used for descrambling when information on the control channel is intercepted, so as to obtain specific information content.

Then, after allocating the scheduling information to the UEs performing the direct communication, the base station may use the identifier A to scramble the physical control channel, and then transmit the scheduling information over the physical control channel. The UEs performing the direct communication may intercept the physical control channel, and descramble the physical control channel by using the identifier A that is previously obtained from the base station. In this way, the UEs that participate in the direct communication determine the scheduling information used for data sending or receiving.

In specific implementation, the scheduling information that is transmitted only once may be borne by a PDCCH (physical downlink control channel) directly, or borne by a newly defined physical control channel. The newly defined physical control channel may be transmitted in a data zone, for example, a control channel similar to an R-PDCCH or an E-PDCCH in a Relay system, and so on.

In a case where the scheduling information allocated to a specific UE is sent at a single attempt to the UEs performing the direct communication, some new fields need to be defined in the scheduling information. For example, a resource identifier (Resource ID) or a link identifier (Link ID) used for indicating a resource may be defined first. Other identifiers that can be defined are an identifier (Transmission indication) used for indicating the UE to which the resources are available for data sending, an identifier (Subframe indication) used for identifying a time resource available for data transmission, a transmit power control identifier (Transmit power control indication), and so on. The following introduces the fields in detail.

The resource identifier (Resource ID) or the link identifier (Link ID) is used for indicating which physical resources are allocated on this occasion. In a practical application, the base station may divide available physical resources (physical resources may be one of or any combination of: a time resource, a frequency resource, a power resource, a codeword resource, a modulation coding scheme, and a space resource) according to a specific granularity (such as subframe, subband, power level, codeword, and so on), and number the divided resources. Each number uniquely identifies a part of physical resources that are available. Such numbers may be called a resource identifier (Resource ID) or a link identifier (Link ID). That is to say, in the embodiment of the present invention, the link identifier (Link ID) and the resource identifier (Resource ID) are the same concept, and are different appellations of the same thing. For example, in an LTE system, if a bandwidth of a carrier is 20 MHz, the carrier includes 100 PRBs (Physical Resource Block, physical resource block). If the physical resources of the base station include only frequency resources and time resources, the base station divides 100 PRBs into 20 subbands (each subband is 5 PRBs in size) on the frequency resources by using 5 PRBs as a granularity, and the base station uses a single subframe as a granularity on a time domain, then the base station may use 5 bits to identify the resource or link. Each Resource ID or Link ID indicates a physical resource that is 5 PRBs with respect to frequency and a single subframe with respect to time.

The Transmission indication indicates a UE to which a current resource is available for data transmission. It is equivalent to direction information for indicating a usage direction of the physical resource corresponding to the resource identifier or the link identifier, so that the UEs performing the direct communication determine according to the usage direction information of the physical resource whether the physical resource corresponding to the resource identifier or the link identifier is a resource for data sending or a resource for data receiving. For example, it is assumed that the UEs performing the direct communication are UE 1 and UE 2, the transmission indication indicates whether a physical resource indicated by the Resource ID or the Link ID in the UE 1 and the UE 2 is used for data sending of the UE 1 (corresponding to receiving by the UE2) or used for data sending of the UE 2 (corresponding to receiving by the UE 1). In specific implementation, in a case where only two UEs perform the direct communication, 1 bit may be used to indicate whether the UE 201 performs data sending or the UE 202 performs data sending.

For example, it may be predefined that, when a status of the bit is 0, it means that the physical resource indicated in the control channel is used for the UE 1 to perform data sending, and correspondingly, the physical resource indicated in the control channel is used for the UE 2 to perform data receiving; or, it may be also predefined that, when the status of the bit is 1, it means that the physical resource indicated in the control channel is used for the UE 2 to perform data sending, and correspondingly, the physical resource indicated in the control channel is used for the UE 1 to perform data receiving. In addition, for both communications parties, one party may be pre-specified as a server (server), and the other party is a client (client). In this case, it may also be predefined that, when the status of the bit is 0, it means that the physical resource indicated in the control channel is used for the server to perform data sending, and correspondingly, the physical resource indicated in the control channel is used for the client to perform data receiving; or, it may also be predefined that, when the status of the bit is 1, it means that the physical resource indicated in the control channel is used for the client to perform data sending, and correspondingly, the physical resource indicated in the control channel is used for the server to perform data receiving.

The base station may define the bit status and notify the corresponding information to the UE 1 and the UE 2, so that the UE 1 and the UE 2 learn a mapping relationship between the bit status and the UE. Specifically, the base station may use RRC signaling, or MAC signaling, or another response message sent by the base station to the UE, to indicate which of the UE 1 and the UE 2 is a server, and which is a client. Alternatively, the base station may also use the RRC signaling, or the MAC signaling, or another response message sent by the base station to the UE, to indicate which bit status in the transmission indication belongs to the UE, for the UE.

The Subframe indication identifies an available time resource that is available to the sending UE and the receiving UE for performing transmission. That is to say, both of the two UEs performing the direct communication may need to send data to the opposite party. In this case, the same UE may change between a sender role and a receiver role in the same period. For example, if the UE 1 needs to send data to the UE 2, the UE 1 needs to serve as a sender to send the data to the UE 2, and correspondingly, the UE 2 serves as a receiver to receive the data sent by the UE 1. Meanwhile, the UE 2 may also need to send data to the UE 1, and in this case, the UE 2 serves as a sender, and correspondingly, the UE 1 serves as a receiver. Therefore, an available time resource needs to be allocated to each UE beforehand, and each UE sends data within only its own available time resource. In order to reduce overhead of transmitting the scheduling information between the base station and the UE, the scheduling information sent to multiple UEs simultaneously may be applied to multiple subframes. The Subframe indication indicates a subframe available to each UE for data sending within a time period T. In practical implementation, the Subframe indication may be given in multiple manners, which are introduced below using several examples.

Manner 1: The Subframe indication may be given by using a bitmap (bitmap). For example, assuming that a time period T includes N subframes, that both parties performing the direct communication are UE 1 and UE 2, and that each subframe is either used for data sending of the UE 1 or used for data sending of the UE 2, each subframe may use 1 bit to indicate its usage status, and may use N bits to separately indicate which of the N subframes are used for data sending of the UE 1, and which subframes are used for data transmission of the UE 2. For example, it is preset that, when the bit status is 0, it represents UE 1, and, when the bit status is 1, it represents UE 2, and therefore, the Subframe indication may be expressed as "0100110110 . . . ", which is used to indicate that: The first subframe is used for the UE 1 to perform data sending, the second subframe is used for the UE 2 to perform data sending, the third subframe is used for the UE 1 to perform data sending, and the fourth subframe is used for the UE 1 to perform data sending, and so on. Definitely, if certain subframes are neither used for data sending of the UE 1 nor used for data sending of the UE 2, one subframe may exist in three statuses. Therefore, each subframe may use 2 bits to indicate its usage status. For example, 00 is used to indicate that the subframe is used for data sending of the UE 1, and 01 is used to indicate that the subframe is used for data sending of the UE 2, and 11 is used to indicate that the subframe is neither used for data sending of the UE 1 nor used for data sending of the UE 2.

Figure 3:
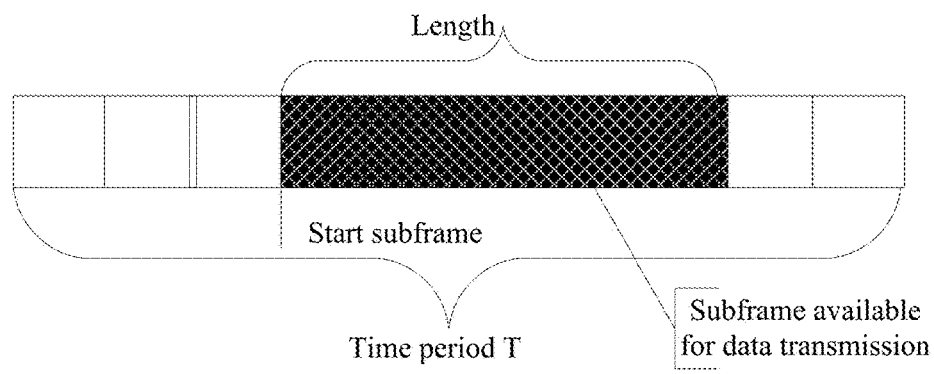
FIG. 3 is a schematic diagram of an indication method that gives an indication by using a start point and a length according to an embodiment of the present invention.

Manner 2: The Subframe indication may also be given by using a start point and a length, as shown in FIG. 3. For example, the time period T includes N subframes, and "start" may be used to indicate a start point of a subframe used for a specific UE to perform data sending, and "length" may be used to indicate the number of subframes used for the UE to perform data sending within the time period T. In this case, all the subframes start, start+1, . . . , and start+length−1 are subframes available to the UE for data sending. Alternatively, if it is deemed by default that the subframes used for a specific UE to perform data sending always begin with the first subframe in the time period T, the start does not need to be indicated. When the Subframe indication is given by using a start point and a length, if the parties performing the direct communication include only UE 1 and UE 2, and all other subframes than the subframe used for the UE 1 to perform data sending in the time period T are subframes used for the UE 2 to perform data sending, the Subframe indication needs only to indicate the subframes used for either of the UEs to perform data sending, and correspondingly, other subframes than such subframes are used for the other UE to perform data sending; otherwise, the Subframe indication needs to separately indicate the start point and the length of the subframes used for the UE 1 and UE 2 to perform data sending.

Manner 3: The Subframe indication may also be given by using a pattern (pattern). For example, the base station may configure a limited number of subframe patterns in the time period T, and each subframe pattern indicates subframe resources available to each of the UEs performing the direct communication separately for transmission. If the total number of patterns is M and two UEs (UE 1 and UE 2 separately) perform direct communication, ceil(log$_2$ M) bits may be used to indicate the specific pattern for the UE 1 and the UE 2, where ceil(x) refers to rounding up x.

Definitely, regardless of the manner and the circumstance, the base station may notify the meaning of the Subframe indication beforehand to each UE performing the direct communication, or the base station gives the indication in a pre-specified manner, and the UE saves the pre-specified manner, and so on.

The Transmit power control indication is used to perform power control for the transmit power of the UEs performing the direct communication. Power control may be performed for the transmit power of the UEs performing the direct communication (for example, by indicating a relative value for adjusting the transmit power of the UE) in a manner similar to a field used for a PUSCH (Physical uplink shared channel, physical uplink shared data channel) or PUCCH (Physical uplink control channel, physical uplink control channel) power control identifier in a PDCCH in an LTE system; or allowed maximum transmit power is directly indicated to the UEs under communication. For example, the base station may determine a transmit power set, and a Transmit power control indication field indicates a specific element in the transmit power set, where the element determines the allowed maximum transmit power of the UEs performing the direct communication.

It should be noted that in the embodiment of the present invention, when power control is performed for the UEs performing the direct communication, main factors considered are: on the precondition that normal signal transmission is ensured between the UEs performing the direct communication, interference on other UEs is reduced as far as possible. This is equivalent to a constraint on the transmit power of the UE, and prevents the transmit power of the UE from being excessively high. Therefore, the base station indicates a maximum value of the transmit power to the UEs performing the direct communication.

The following uses a specific example to introduce each of the above fields in detail. For example, the base station divides 100 PRBs into 20 subbands by using 5 PRBs as a granularity on frequency resources, and the base station uses the second subband for data sending of the UE. The base station indicates that a current resource identifier or link identifier is used for the UE 1 to perform data sending (that is, used for the UE 2 to perform data receiving), where the bit status "0" represents UE 1. The base station indicates an available data subframe in a manner of indicating the subframe available for data sending by using a start point and a length, where the time period T includes 10 subframes, the start point is the first subframe by default, and the length is equal to 6. A transmit power set determined by the base station is {23 dBm, 10 dBm, 0 dBm, −10 dBm}, and therefore, the scheduling information may include the following content:

```
{ 000010 /* Resource ID or Link ID, indicating that the available
physical resource is the second subband*/;
    0 /*Transmission indication, indicating that the available physical
resource is used for the UE 1 to perform data sending*/;
    0110 /* Subframe indication, indicating that the subframes available
for data sending begin with the first subframe, and the length is 6 */;
    01 /*Transmit power control indication, indicating that the maximum
allowed transmit power is 10 dBm */
    ...
}
```

The following describes each of the above fields.

First, in the above method description, the Resource ID or the Link ID identifies only an index of a physical available resource. Definitely, in a practical application, the Resource ID or Link ID may explicitly or implicitly include information about a usage direction of the available physical resource. That is, while indicating the physical resource, the Resource ID or Link ID also indicates the specific UE that uses the available physical resource information included in the current scheduling information to perform data sending. For example, one or more bits in the Resource ID or Link ID indication field may be used for indicating a direction of the scheduling information.

Alternatively, the Resource IDs or Link IDs may also be divided into two or more sets (or groups), and the direction of the scheduling information is indicated by putting a Resource ID or Link ID into a different set (or group). For the latter circumstance, if there are two UEs performing direct communication, the Resource IDs or Link IDs may be divided into two sets. The first set is resources available to the UE 1, and the second set is resources available to the UE 2. Therefore, after the UE 1 and the UE 2 sense the scheduling information in the control channel and parse the scheduling information to obtain the Resource ID or Link ID carried in the scheduling information, if it is found that the Resource ID or Link ID belongs to the first set, it can be known that the corresponding available physical resource is used for the UE 1 to perform data sending; and, if the Resource ID or Link ID belongs to the second set, it can be known that the corresponding available physical resource is used for the UE 2 to perform data sending. In addition, before the scheduling information is transmitted to the UE, the direction of the scheduling information may be notified to each UE. Obviously, when the Resource ID or Link ID has a function of indicating the direction of the scheduling information, or a direction indication of the scheduling information is notified to the UE beforehand, the scheduling information no longer needs to include the Transmission indication field. That is to say, the information about the usage direction of the physical resource may be indicated by the resource identifier or the link identifier implicitly, or may be indicated by a transmission indication identifier in the scheduling information explicitly.

Second, in some scenarios, if the interference caused by the transmit power onto other UEs does not need to be considered, the Transmit power control indication field may be not necessary.

Third, in the embodiment of the present invention, if the scheduling information transmitted by the base station indicates that a specific UE (such as UE 1) in the UEs performing the direct communication performs data sending and the Subframe indication field indicates a subframe resource available to the UE for data sending in the time period T, then, when another UE (such as UE 2) in the UEs performing the direct communication also needs to perform data sending, the base station may send another piece of scheduling information for the UE 2 to perform data sending. That is to say, a piece of scheduling information can carry the available physical resource that is available to only a specific UE for data sending. If the available physical resources that are available to other UEs for data sending need to be carried, the available physical resources need to be carried in other scheduling information. However, to reduce resource overhead for transmitting the scheduling information, the base station does not need to re-send to the UE 2 the scheduling information that is available to the UE 2 for data sending. In this case, the UE 2 can perform data sending by reusing part or all of the scheduling information (such as resource indication information, modulation coding scheme MCS indication information, and so on) in the scheduling information sent to the UE 1. In this case, it may be deemed that in the time period T, all other resources except the subframe resource available to the UE 1 for data transmission are data transmission resources available to the UE 2. That is to say, the UE 1 and the UE 2 may share the same or partly same transmission resources such as available physical resources. However, data sending still needs to be performed on the subframe allocated to each of them.

The foregoing text has introduced the sending manner of the scheduling information and definitions of the fields in detail. After receiving the scheduling information, the UEs performing the direct communication can use the scheduling information to perform data transmission (definitely, if some quickly varying scheduling information exists additionally, such information needs to be obtained through direct exchange between the UEs). In a practical application, to use resources efficiently, the base station needs to learn whether the UE has finished data transmission so as to decide whether the physical resource previously allocated to the UE needs to be released; or, the base station needs to learn the amount of data to be transmitted by the UE (that is, a buffer size Buffer status), so as to allocate the resources properly (for example, when the amount of data to be transmitted is large, the base station may allocate more resources to the UE; or conversely, the base station reduces the physical resources allocated to the UE). For example, when the data transmission of a specific UE 1 is about to come to an end, the UE 1 may instruct the base station to release the physical resources that are previously allocated to the UE 1, which makes the physical resources be available to other UEs and improves utilization efficiency of the physical resources; or the UE 1 reports the buffer status to the base station statically or semi-statically, and the base station decides, according to the buffer status report, the physical resources (including frequency domain resources and time domain resources) that need to be allocated to the UE 1.

In practical implementation, the system may define a new physical channel for bearing indication information through which the UE instructs the base station to release the resource allocated to the UE; or use an existing physical channel to let the UE instruct the base station to release the physical resource allocated to the UE. For example, a PUCCH channel in an LTE system may bear indication information indicating whether the data is received successfully (ACK indicates successful receiving and NACK indicates unsuccessful receiving). In the case of single-codeword transmission, 1 bit may be used for ACK and NACK indication. Similar to the PUCCH bearing the ACK and NACK indication information, the PUCCH may be used to bear indication information through which the UE instructs the base station to release the physical resource allocated to the UE. For example, 1 bit is used to indicate whether the UE instructs the base station to release the physical resource allocated to the UE. In this case, the physical resources of the PUCCH (including a time resource for transmission, a frequency resource, a period, a power resource, and so on) may be predetermined, or determined dynamically according to the method in the LTE system. In addition, the UE may also, by initiating a specific random access preamble sequence or using a specific scheduling request format or using certain bits in the CSI feedback, instruct the base station to release the physical resource that is previously allocated to the UE. No matter which method is applied, it is appropriate if a specific indication status or format lets the base station understand the need of releasing the physical resource, and the detailed method is not repeated here any further.

The buffer status report of the UE may be reported according to an existing mechanism of the LTE, or reported by using physical layer signaling. For example, the system may define a buffer size set, and each element in the set represents a buffer size. The UE uses a bit to indicate a current buffer size. The bit for indicating the current buffer size may be borne by a newly defined physical channel or by an existing physical channel (for example, the bit for indicating the current buffer size may be borne in a way similar to the method of the PUCCH or PUSCH bearing CSI information or bearing multiple ACKs/NACKs). The detailed method is not repeated here any further.

In all the embodiments described above, it is assumed that there are two UEs performing the direct communication. In a practical application, however, it is possible that one UE transmits data to multiple UEs directly. In this case, the base station may transmit invariable or slowly varying scheduling information (for example, information indicating available physical resources required for data transmission of the UE, parameters for controlling the transmit power of the UE, and so on) to multiple (more than 2) UEs statically or semi-statically. If link self-adaptation (a modulation coding scheme, a precoding matrix, and so on, are selected self-adaptively according to change of the channel) is required between the UEs, the scheduling information that changes quickly (that is, not slowly varying) may be transmitted directly between the UEs.

Figure 4:
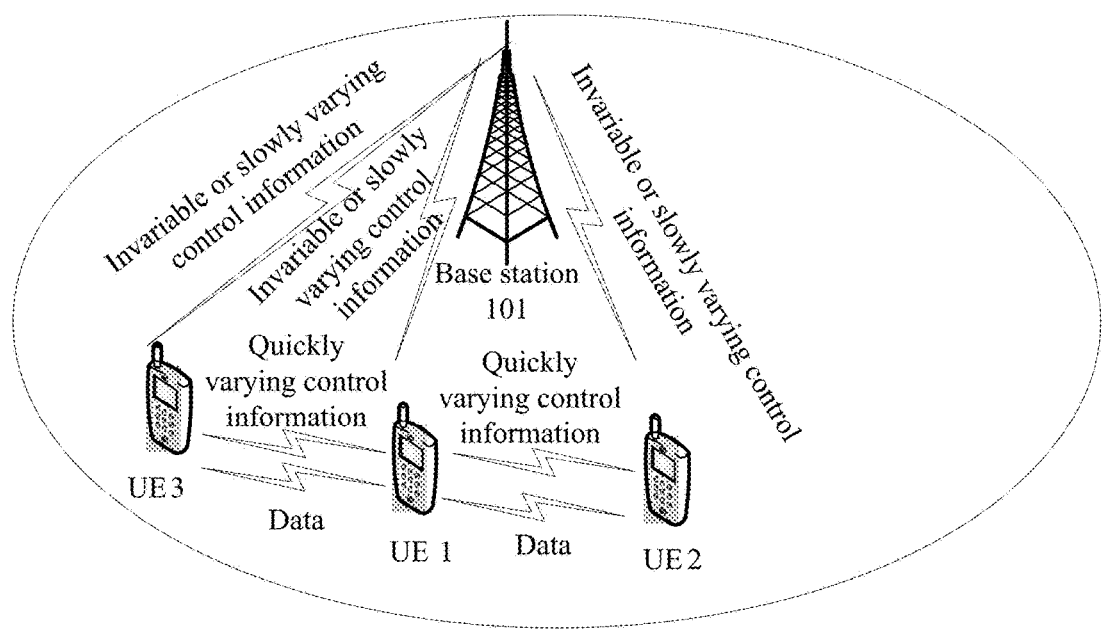
FIG. 4 is a schematic diagram of another method for transmitting scheduling information according to an embodiment of the present invention.

As shown in FIG. 4, the base station, the UE 1, the UE 2, and the UE 3 make up a communications system. If the UE 1 needs to transmit the same data to the UE 2 and the UE 3, when the UE 1, the UE 2, and the UE 3 are close to each other, the UE 1 may perform direct communication with the UE 2 and the UE 3. This circumstance is especially applicable to services such as broadcast, multicast, and multicast. As shown in FIG. 4, when the UE 1 needs to transmit the same data to the UE 2 and the UE 3, the base station may transmit a copy of scheduling information to the UE 1, UE 2, and UE 3. In this case, to save overhead of transmitting the scheduling information, the base station may also allocate an identifier to the UE 1, the UE 2, and the UE 3, and notify the identifier to the UE 1, the UE 2, and the UE 3. In this way, the UE 1, the UE 2, and the UE 3 may use the identifier to detect the same control channel and obtain the scheduling information, thereby reducing overhead of control resources.

In a way similar to the scheduling information transmission method described above, the base station transmits the invariable or slowly varying scheduling information to the UE 1, the UE 2, and the UE 3 statically or semi-statically; and, when dynamic scheduling information exists, the UE 1 may transmit the dynamic scheduling information to the UE 2 and UE 3. Specifically, when the scheduling information is sent, fields in the scheduling information may be similar to those applied in the case of a pair of UEs, but differ in that: with increase of the number of the UEs performing the direct communication, if the scheduling information borne on a single control channel of the base station is applicable to scheduling of multiple UEs (for example, for scheduling transmission of not only the UE 1, but also scheduling transmission of the UE 2 and the UE 3), the Transmission indication, the Subframe indication, and the Transmit power control indication may include the transmission indication, the subframe resource indication, and the transmit power indication for the multiple UEs. The indication method of each field is similar to the indication method described above, and is not repeated here any further.

In addition, the UE may also instruct the base station to release the physical resources that are previously allocated to the UE, which makes the physical resources be available to other UEs and improves utilization efficiency of the physical resources; or the UE reports the buffer status to the base station statically or semi-statically, and the base station decides, according to the buffer status report, the physical resources (including frequency domain resources and time domain resources) that need to be allocated to the UE. The UE needs to instruct the base station to release the physical resources that are previously allocated to the UE, or report the buffer status report, which is similar to that described above and is not repeated here any further.

In addition, in order to further reduce the overhead required for transmitting the scheduling information, in other embodiments of the present invention, the base station may transmit the invariable or slowly varying scheduling information (for example, information indicating the resources required for data transmission of the UE, parameters for controlling the transmit power of the UE, and so on) to multiple pairs of UEs performing the direct communication statically or semi-statically. Similarly, if link self-adaptation (a modulation coding scheme, a precoding matrix, and so on, are selected self-adaptively according to change of the channel) is required between the UEs, the scheduling information that changes quickly (that is, quickly varying) may be transmitted directly between the UEs.

In this case, the base station may also notify an identifier to multiple pairs of UEs performing the direct communication. In this way, multiple pairs of UEs performing the direct communication may use the identifier to detect the same control channel and obtain the scheduling information, thereby reducing overhead of the control resource. The base station may use the PDCCH or a newly defined control channel to schedule multiple pairs of UEs performing the direct communication. However, different from the circumstance with only one pair of UEs performing the direct communication, in the circumstance with multiple pairs of UEs performing the direct communication, the control channel includes the scheduling information for multiple pairs of UEs performing the direct communication. For example, if the control channel PDCCH is used to schedule two pairs of UEs performing the direct communication, the format of the PDCCH may be:

{
  { /*scheduling information for the first pair of UEs

-continued

```
performing the direct communication*/
        Resource ID 1 or Link ID 1; Transmission indication 1;
Subframe indication 1; Transmit power control indication 1; ...
        }
        { /*scheduling information for the second pair of UEs
performing the direct communication*/
        Resource ID 2 or Link ID 2; Transmission indication 2;
Subframe indication 2; Transmit power control indication 2; ...
        }
}
```

It can be seen that, when the base station schedules multiple pairs of UEs performing the direct communication, the control channel needs to include scheduling information for each pair of UEs performing the direct communication. Because the content of the scheduling information for each pair of UEs performing the direct communication is similar to that described above, the details are not repeated here any further.

Figure 5:
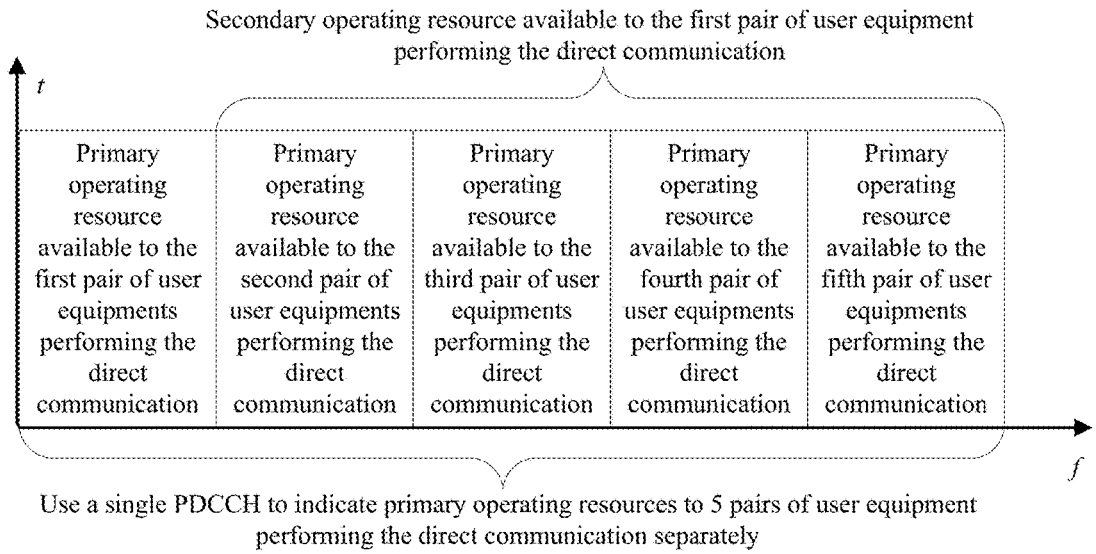
FIG. 5 is a schematic diagram of a primary operating resource and a secondary operating resource in a method according to an embodiment of the present invention.

It should be noted that, in the case of scheduling multiple pairs of UEs performing the direct communication, each pair of UEs can actually obtain multiple portions of specific resources, where Resource ID n or Link ID n indicates a specific resource that is available to the $n^{th}$ pair of UEs performing the direct communication, and the specific resource may be known as a "primary operating resource" of the $n^{th}$ pair of UEs performing the direct communication. The $n^{th}$ pair of UEs performing the direct communication may use not only their own primary transmission resource, but may also, by sensing interference or signal strength on the primary operating resources of other UE pairs indicated in the control channel scheduling indication, decide whether to use the primary operating resources of other UE pairs. For example, the $n^{th}$ pair of UEs performing the direct communication senses the interference or signal quality on the primary operating resources of the $m^{th}$ pair of UEs performing the direct communication. If, by performing measurement and detection, the $n^{th}$ pair of UEs performing the direct communication finds that the primary operating resource of the $m^{th}$ pair of UEs performing the direct communication is applied and no serious interference will be caused onto the signal transmission of the $m^{th}$ pair of UEs performing the direct communication, the $n^{th}$ pair of UEs performing the direct communication may use the primary operating resource of the $m^{th}$ pair of UEs performing the direct communication as its own "secondary operating resource", and, when necessary, may use the resource capable of serving as the "secondary operating resource" to perform transmission to improve utilization efficiency of the resource. FIG. 5 further gives a schematic diagram of a relationship between the primary operating resource and the secondary operating resource.

Like what is described above, the UE may also instruct the base station to release the physical resources that are previously allocated to the UE, which makes the physical resources be available to other UEs and improves utilization efficiency of the physical resources; or the UE reports the buffer status to the base station statically or semi-statically, and the base station decides, according to the buffer status report, the physical resources (including frequency domain resources and time domain resources) that need to be allocated to the UE. The specific implementation manner is similar to what is described above, and is not repeated here any further.

Figure 6:
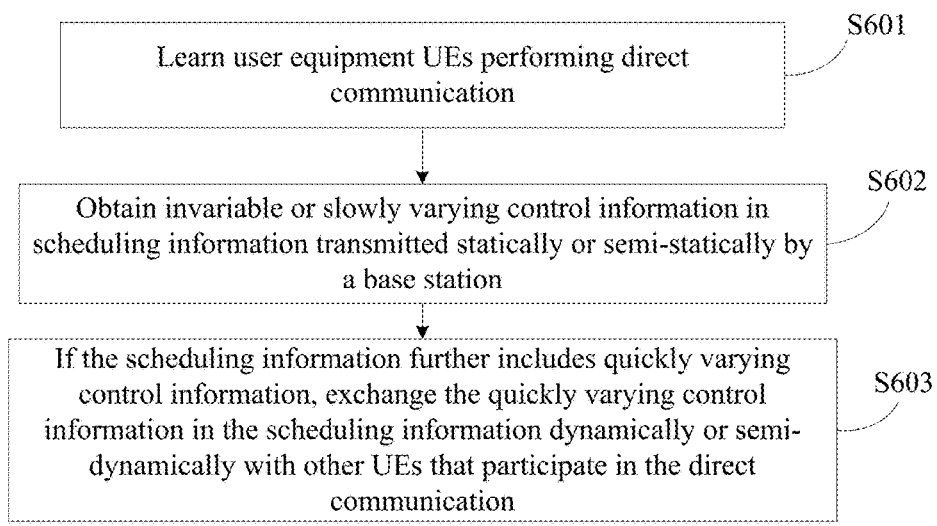
FIG. 6 is a flowchart of a method for obtaining scheduling information according to an embodiment of the present invention.

The above description mainly introduces the method for transmitting scheduling information according to the embodiment of the present invention from a perspective of a base station. Correspondingly, an embodiment of the present invention further provides a method for obtaining scheduling information from a perspective of UEs performing the direct communication. As shown in FIG. 6, the method includes the following steps.

S601. Learn user equipments UEs performing the direct communication.

It is the base station that determines whether the direct communication can be performed between the UEs. When the base station finds that conditions of the direct communication between two (or more) UEs are met, the base station may send a notification message to each UE that participates in the direct communication. In this way, the UE learns according to the information sent by the base station whether the direct communication can be performed, and learns the opposite UE that participates in the direct communication.

S602. Obtain invariable or slowly varying control information in the scheduling information transmitted statically or semi-statically by a base station.

S603. If the scheduling information further includes quickly varying control information, exchange the quickly varying control information in the scheduling information dynamically or semi-dynamically with other UEs that participate in the direct communication.

That is to say, if the scheduling information further includes a quickly varying part, the quickly varying part of the scheduling information may be exchanged with another UE performing the direct communication dynamically. In other words, the sending UE performing the direct communication sends the quickly varying control information in the scheduling information dynamically or semi-dynamically to the receiving device performing the direct communication (it should be noted that a UE performing the direct communication may not serve as a sender or receiver fixedly, and therefore, when the quickly varying control information is exchanged, each UE sends the quickly varying control information used when this UE serves as a sender to another UE, and at the same time, may need to receive the quickly varying control information used when the other UE serves as a sender and sent from the other UE), and then direct communication is performed with the other user equipment UE according to the invariable or slowly varying scheduling information and the quickly varying scheduling information.

To save transmission resources, the base station may transmit the scheduling information allocated to a specific UE to each UE performing the direct communication only once. Correspondingly, the UEs performing the direct communication can obtain the invariable or slowly varying control information transmitted, over the same physical control channel, by the base station to each of the UEs performing the direct communication.

In specific implementation, the UE may obtain the same identifier allocated by the base station to each UE performing the direct communication, and use the same identifier to descramble the received physical control channel to obtain the scheduling information available to the UE for data sending or receiving.

The scheduling information may include a resource identifier or a link identifier used for indicating a physical resource, and information about a usage direction of the physical resource corresponding to the resource identifier or the link identifier, and correspondingly, the UEs performing the direct communication may determine according to the information about the usage direction of the physical resource whether the physical resource corresponding to the resource identifier or the link identifier is a resource for data sending or a resource for data receiving. If the physical resource is a resource for data sending, data sending is performed on the resource; otherwise, data receiving is performed on the resource.

If switching of sending and receiving occurs between the UEs performing the direct communication, the scheduling information may further include an identifier used to indicate an available time resource that is available to each of the UEs performing the direct communication for data sending. Correspondingly, the UEs performing the direct communication may determine, according to the identifier, the time resource available to themselves for data sending or receiving, and perform data sending on only the time resource available for data sending.

In addition, the scheduling information may further include a power control identifier for controlling the transmit power of the UEs performing the direct communication. Correspondingly, the UEs performing the direct communication may determine, according to the power control identifier, the transmit power in the direct communication.

The base station may transmit the invariable or slowly varying control information in the scheduling information to multiple pairs of UEs performing the direct communication over the same physical channel. In this case, the UEs may obtain the invariable or slowly varying control information transmitted, over the same physical control channel, by the base station to multiple pairs of UEs that participate in the direct communication. In addition, signal quality on the physical resource allocated to other UE pairs performing the direct communication may be measured. If the signal quality meets a preset condition, the physical resource allocated to other UE pairs performing the direct communication is used as a secondary operating resource.

To improve utilization efficiency of resources, when data transmission is completed or is about to be completed, the UEs performing the direct communication may send, through physical layer signaling, a notification message of releasing a physical resource to the base station, so that the base station releases the physical resource allocated to the UE and that the resource is available to other UEs.

Alternatively, information used for indicating a buffer status of the base station may be sent to the base station so that the base station allocates the physical resources according to the information, where the information may be sent over a physical channel when the information is sent.

It should be noted that the method for the UEs performing the direct communication to obtain the scheduling information corresponds to the method for the base station to transmit the scheduling information. Therefore, for the part that is not detailed, reference may be made to the description about the method for the base station to transmit the scheduling information, and no repeated description is given here any further.

Figure 7:
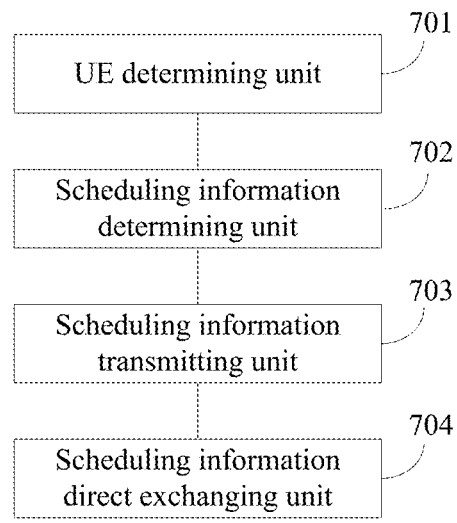
FIG. 7 is a schematic diagram of an apparatus for transmitting scheduling information according to an embodiment of the present invention.

Corresponding to the method for transmitting scheduling information provided in the embodiment of the present invention, an embodiment of the present invention further provides an apparatus for transmitting scheduling information. Referring to FIG. 7, the apparatus includes a number of units. A UE determining unit 701 is configured to determine user equipments UEs performing direct communication. A scheduling information determining unit 702 is configured to determine scheduling information required for data transmission for the UEs performing the direct communication. A scheduling information transmitting unit 703 is configured for a base station to transmit invariable or slowly varying control information in the scheduling information to each of the UEs performing the direct communication statically or semi-statically. A scheduling information direct exchanging unit 704 is configured for a UE serving as a sender in the UEs performing the direct communication to, if the scheduling information further includes quickly varying control information, transmit the quickly varying control information in the scheduling information dynamically or semi-dynamically to a UE serving as a receiver in the UEs performing the direct communication.

To save resources occupied by the control information transmitted by the base station, the scheduling information transmitting unit 703 may be specifically configured to transmit the invariable or slowly varying control information in the scheduling information to each of the UEs performing the direct communication over a same physical control channel.

In specific implementation, the scheduling information transmitting unit 703 may include an identifier allocating sub unit and a transmitting sub unit. The identifier allocating subunit is configured to allocate a same identifier to each of the UEs performing the direct communication, and notify the same identifier to each of the UEs performing the direct communication. The transmitting subunit is configured to use the same identifier to scramble and transmit the physical control channel that bears the invariable or slowly varying information, so that each of the UEs performing the direct communication uses the same identifier to descramble the received physical control channel, and that the UEs performing the direct communication determine scheduling information used for data sending or receiving.

Because the invariable or slowly varying part is sent over the same physical control channel, when the information is sent, the information needs to include a resource identifier or a link identifier used for indicating a physical resource, and information about a usage direction of the physical resource corresponding to the resource identifier or the link identifier, so that the UEs performing the direct communication determine, according to the information about the usage direction of the physical resource, whether the physical resource corresponding to the resource identifier or the link identifier is a resource for data sending or a resource for data receiving. The information about the usage direction of the physical resource is indicated implicitly by the resource identifier or the link identifier; or the information about the usage direction of the physical resource is indicated explicitly by a transmission indication identifier in the scheduling information.

The scheduling information may further include an identifier used for indicating an available time resource that is available to each of the UEs performing the direct communication for data sending, so that the UEs performing the direct communication determine, according to the identifier, their respective time resources available for data sending and receiving.

In addition, if power control needs to be performed for the UEs performing the direct communication, the scheduling information may further include a power control identifier used for controlling transmit power of the UEs performing the direct communication.

The control information transmitting unit may include a first transmitting subunit, configured to use the same physical control channel to perform transmission to a pair of UEs that participate in the direct communication; or a second transmitting subunit, configured to use the same physical control channel to perform transmission to multiple UEs that participate in the direct communication; or a third transmitting subunit, configured to use the same physical control channel to perform transmission to multiple pairs of UEs that participate in the direct communication.

To improve the utilization rate of physical resources, the apparatus may further include a notification message receiving unit, configured to receive, through physical layer signaling, a physical resource releasing notification message sent by the UEs performing the direct communication; and a resource releasing unit, configured to release physical resources allocated for use by the UEs performing the direct communication.

To avoid waste of the physical resources, the apparatus may further include a status information receiving unit, configured to receive information sent by the UEs performing the direct communication and used for indicating a buffer status of the UEs; and a resource allocating unit, configured to allocate physical resources to the UEs according to the information.

In specific implementation, the status information receiving unit may be specifically configured to receive, through physical layer signaling, information sent by the UEs performing the direct communication and used for indicating a buffer status of the UEs.

Figure 8:
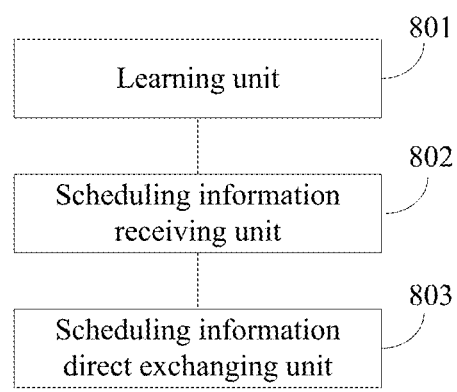
FIG. 8 is a schematic diagram of an apparatus for obtaining scheduling information according to an embodiment of the present invention.

Corresponding to the method for obtaining scheduling information provided in the embodiment of the present invention, an embodiment of the present invention further provides an apparatus for obtaining scheduling information. Referring to FIG. 8, the apparatus includes a number of units. A learning unit is configured to learn user equipments UEs performing direct communication. A scheduling information receiving unit is configured to obtain invariable or slowly varying control information in the scheduling information transmitted statically or semi-statically by a base station. A scheduling information direct exchanging unit is configured to, if the scheduling information further includes quickly varying control information, exchange the quickly varying control information in the scheduling information dynamically or semi-dynamically with other UEs that participate in the direct communication.

When the base station sends the invariable or slowly varying scheduling information to both parties of the UEs performing the direct communication over the same physical control channel, the scheduling information receiving unit may be specifically configured to obtain the invariable or slowly varying control information transmitted, over a same physical control channel, by the base station to each of the UEs performing the direct communication.

To enable the UE to obtain the scheduling information sent, over the same physical control channel, by the base station, the apparatus may further include an identifier obtaining subunit, configured to obtain a same identifier allocated by the base station to each of the UEs performing the direct communication; and a descrambling subunit, configured to use the same identifier to descramble the received physical control channel to obtain scheduling information used for data sending or receiving.

In a case where the base station sends the invariable or slowly varying scheduling information to both parties of the UEs performing the direct communication over the same physical control channel, the scheduling information may include a resource identifier or a link identifier used for indicating a physical resource, and information about a usage direction of the physical resource corresponding to the resource identifier or the link identifier, and the apparatus further includes a usage direction determining unit, configured to determine, according to the information about the usage direction of the physical resource, whether the physical resource corresponding to the resource identifier or the link identifier is a resource for data sending or a resource for data receiving.

The scheduling information further includes an identifier used for indicating an available time resource that is available to each of the UEs performing the direct communication for data sending, and the apparatus further includes a time resource determining unit, configured to determine a time resource available for data sending or receiving according to the identifier.

If the base station performs power control for the UEs performing the direct communication, the scheduling information may further include a power control identifier used for controlling transmit power of the UEs performing the direct communication, and the apparatus may further include a transmit power determining unit, configured to determine transmit power existent during the direct communication according to the power control identifier.

If what is obtained by the scheduling information receiving unit is the invariable or slowly varying control information transmitted by the base station over the same physical control channel to multiple pairs of the UEs that participate in the direct communication, the apparatus may further include: a measuring unit, configured to measure signal quality on physical resources allocated to other UE pairs performing the direct communication; and a secondary operating resource determining unit, configured to: if the signal quality meets a preset condition, use the physical resources, which are allocated to the other UE pairs performing the direct communication, as secondary operating resources.

To improve the utilization rate of physical resources, the apparatus may further include a release notifying unit, configured to send, through physical layer signaling, a physical resource releasing notification message to the base station so that the base station releases the allocated physical resources.

To avoid waste of resources, the apparatus may further include a status information sending unit, configured to send information used for indicating a buffer status of the base station to the base station so that the base station allocates the physical resources according to the information.

In specific implementation, the status information sending unit may specifically send, through physical layer signaling, the information used for indicating the buffer status of the base station.

In summary, with the apparatus for transmitting or obtaining scheduling information provided in the embodiments of the present invention, the base station may transmit the invariable or slowly varying part in the scheduling information statically or semi-statically to the UEs that participate in the direct communication. If the scheduling information further includes a quickly varying part, direct exchange can be performed dynamically or semi-dynamically between the UEs that participate in the direct communication. In this way, on one hand, because the invariable or slowly varying information is allocated by the base station, serious interference caused onto other UEs in the network can be avoided; and, on the other hand, because the base station needs only to perform sending statically or semi-statically, resource overhead consumed for transmitting the scheduling information can be reduced. In addition, because the quickly varying part in the scheduling information can be exchanged directly between the UEs dynamically or semi-dynamically, it can be ensured that the quickly varying part of the control information can be updated at a frequency that is high enough.

It should be noted that the apparatus for transmitting or obtaining scheduling information corresponds to the method for transmitting or obtaining scheduling information. For the part that is not detailed in the apparatus embodiment, reference may be made to the introduction in the method embodiment, and no repeated description is given here any further.

Persons of ordinary skill in the art should understand that all or a part of the steps of the method in the embodiments may be implemented by a program instructing relevant hardware. The program may be stored in a computer readable storage medium. When the program is run, the following steps are included: determining user equipments UEs performing direct communication; determining scheduling information required for data transmission for the UEs performing the direct communication; transmitting, by a base station, invariable or slowly varying control information in the scheduling information to each of the UEs performing the direct communication statically or semi-statically; and if the scheduling information further includes quickly varying control information, transmitting, by a UE serving as a sender in the UEs performing the direct communication, the quickly varying control information in the scheduling information dynamically or semi-dynamically to a UE serving as a receiver in the UEs performing the direct communication.

Alternatively, the following steps are included: learning user equipments UEs performing the direct communication; obtaining invariable or slowly varying control information in the scheduling information transmitted statically or semi-statically by a base station; and if the scheduling information further includes quickly varying control information, exchanging the quickly varying control information in the scheduling information dynamically or semi-dynamically with other UEs that participate in the direct communication. The storage medium may be a ROM/RAM, a magnetic disk, an optical disc, and so on.

The foregoing text has introduced in detail a method and an apparatus for transmitting and obtaining scheduling information according to the present invention. Specific examples are used for expounding the principles and implementation manners of the present invention. The description of the embodiments is used merely to help understand the method of the present invention and its core ideas. Persons of ordinary skill in the art can make variations to the present invention with respect to specific implementation manners and application scopes according to the ideas of the present invention. To sum up, the content described herein shall not be construed as a limitation to the present invention.

What is claimed is:

1. A method for transmitting scheduling information, the method comprising:
    determining, by a base station, user equipments (UEs) that are engaged in direct communication;
    determining scheduling information required for data transmission for the UEs that are engaged in the direct communication after determining the UEs that are engaged in the direct communication, the scheduling information comprising first control information and second control information for the UEs to perform direct data transmission, wherein the first control information is updated at a first frequency and the second control information is updated at a second frequency that is different than the first frequency, and wherein the first control information is different from the second control information;
    transmitting, by the base station, the first control information to each of the UEs that are engaged in the direct communication statically or semi-statically; and
    wherein the second control information is transmitted by a first UE in the UEs that are engaged in the direct communication dynamically or semi-dynamically to a second UE in the UEs that are engaged in the direct communication, the first UE configured to transmit data to the second UE in the direct communication.

2. The method according to claim 1, wherein transmitting the first control information comprises transmitting the first control information in the scheduling information to each of the UEs that are engaged in the direct communication over a same physical control channel.

3. The method according to claim 2, wherein transmitting the first control information comprises
    allocating a same identifier to each of the UEs that are engaged in the direct communication;
    notifying the same identifier to each of the UEs that are engaged in the direct communication; and
    using the same identifier to scramble and transmit the physical control channel that bears the first control information, so that each of the UEs that are engaged in the direct communication uses the same identifier to descramble a received physical control channel, and so that the UEs that are engaged in the direct communication determine scheduling information used for data sending or receiving.

4. The method according to claim 2, wherein the scheduling information comprises a resource identifier or a link identifier used for indicating a physical resource and information about a usage direction of the physical resource corresponding to the resource identifier or the link identifier, so that the UEs that are engaged in the direct communication determine, according to the information about the usage direction of the physical resource, whether the physical resource corresponding to the resource identifier or the link identifier is a resource for data sending or a resource for data receiving.

5. The method according to claim 4, wherein the information about the usage direction of the physical resource is indicated implicitly by the resource identifier or the link identifier or the information about the usage direction of the physical resource is indicated explicitly by a transmission indication identifier in the scheduling information.

6. The method according to claim 2, wherein transmitting the first control information comprises using the same physical control channel to perform transmission to multiple UEs that participate in the direct communication.

7. The method according to claim 1, further comprising:
    receiving, through physical layer signaling, a physical resource releasing notification message sent by the UEs that are engaged in the direct communication; and
    releasing physical resources allocated for use by the UEs that are engaged in the direct communication.

8. The method according to claim 1, further comprising:
    receiving information sent by the UEs that are engaged in the direct communication and used for indicating a buffer status of the UEs; and
    allocating physical resources to the UEs according to the information.

9. A method for obtaining scheduling information, the method comprising:
    learning user equipments (UEs) that are engaged in direct communication;
    obtaining, by a first UE in the UEs, first control information that is transmitted statically or semi-statically by a base station to the first UE, the first control information being updated at a first frequency and being a part of scheduling information that is determined by the base station after the base station determines the UEs that are engaged in the direct communication, wherein the scheduling information further comprises second control information that is updated at a second frequency that is different than the first frequency, and the first control information and the second control information provide information for direct data transmission of the UEs, and wherein the first control information is different from the second control information; and exchanging the second control information, dynamically or semi-dynamically, with other UEs that participate in the direct communication and that are in direct communication with the first UE.

10. The method according to claim 9, wherein obtaining the first control information comprises obtaining the first control information transmitted, over a same physical control channel, by the base station to each of the UEs that are engaged in the direct communication.

11. The method according to claim 10, wherein obtaining the first control information transmitted comprises:
obtaining a same identifier allocated by the base station to each of the UEs that are engaged in the direct communication; and
using the same identifier to descramble a received physical control channel to obtain scheduling information used for data sending or receiving.

12. The method according to claim 10, wherein the scheduling information comprises a resource identifier or a link identifier used for indicating a physical resource, and information about a usage direction of the physical resource corresponding to the resource identifier or the link identifier; and
wherein the method further comprises determining, according to the information about the usage direction of the physical resource, whether the physical resource corresponding to the resource identifier or the link identifier is a resource for data sending or a resource for data receiving.

13. An apparatus for transmitting scheduling information, the apparatus comprising:
a UE determining unit, configured to identify user equipments (UEs) that are engaged in direct communication;
a scheduling information determining unit, configured to determine scheduling information required for data transmission for the UEs that are engaged in the direct communication after the UEs that are engaged in the direct communication are identified, the scheduling information comprising first control information and second control information for the UEs to perform direct data communications, wherein the first control information is updated at a first frequency and the second control information is updated at a second frequency that is different than the first frequency, and wherein the first control information is different than the second control information;
a scheduling information transmitting unit, configured to cause a base station to transmit the first control information to a first UE in the UEs that are engaged in the direct communication statically or semi-statically; and
a scheduling information direct exchanging unit, configured to cause the first UE to transmit the second control information dynamically or semi-dynamically to a second UE in the UEs that are engaged in the direct communication, wherein the first UE transmits data to the second UE in the direct communication.

14. The apparatus according to claim 13, wherein the scheduling information transmitting unit is further configured to cause the base station to transmit the first control information in the scheduling information to each of the UEs that are engaged in the direct communication over a same physical control channel.

15. The apparatus according to claim 14, wherein the scheduling information transmitting unit comprises:
an identifier allocating subunit, configured to allocate a same identifier to each of the UEs that are engaged in the direct communication and to notify the same identifier to each of the UEs that are engaged in the direct communication; and
a transmitting subunit, configured to use the same identifier to scramble and to transmit the physical control channel that bears the first control information, so that each of the UEs that are engaged in the direct communication uses the same identifier to descramble a received physical control channel, and that the UEs that are engaged in the direct communication determine scheduling information used for data sending or receiving.

16. The apparatus according to claim 14, wherein the scheduling information comprises a resource identifier or a link identifier used for indicating a physical resource and information about a usage direction of the physical resource corresponding to the resource identifier or the link identifier, so that the UEs that are engaged in the direct communication determine, according to the information about the usage direction of the physical resource, whether the physical resource corresponding to the resource identifier or the link identifier is a resource for data sending or a resource for data receiving.

17. The apparatus according to claim 13, further comprising a status information receiving unit configured to receive, through physical layer signaling, information sent by the UEs that are engaged in the direct communication and used for indicating a buffer status of the UEs.

18. An apparatus for obtaining scheduling information, the apparatus comprising:
a computer including a non-transitory computer-readable medium storing program units executable by the computer, the units including:
a learning unit, configured to learn user equipments (UEs) that are engaged in direct communication;
a scheduling information receiving unit, configured to obtain, at a first UE of the UEs that are engaged in the direct communication and from a base station, first control information that is transmitted statically or semi-statically by the base station, the first control information being updated at a first frequency and being a part of scheduling information that is determined by the base station after the base station identifies the UEs that are engaged in the direct communication; and
a scheduling information direct exchanging unit, configured to, when the scheduling information further comprises second control information that is updated at a second frequency different than the first frequency, cause the first UE to exchange the second control information dynamically or semi-dynamically with other UEs that participate in the direct communication and that are in direct communication with the first UE, wherein the first control information and the second control information provide information for direct data communications of the UEs, and wherein the first control information is different from the second control information.

19. The apparatus according to claim 18, wherein the scheduling information receiving unit is further configured to obtain the first control information transmitted, over a same physical control channel, by the base station to each of the UEs that are engaged in the direct communication.

20. The apparatus according to claim 19, wherein the scheduling information receiving unit comprises:
   an identifier obtaining subunit, configured to obtain a same identifier allocated by the base station to each of the UEs that are engaged in the direct communication; and
   a descrambling subunit, configured to use the same identifier to descramble a received physical control channel to obtain scheduling information used for data sending or receiving.

21. The apparatus according to claim 19, wherein the scheduling information comprises a resource identifier or a link identifier used for indicating a physical resource and information about a usage direction of the physical resource corresponding to the resource identifier or the link identifier, and the units further include:
   a usage direction determining unit, configured to determine, according to the information about the usage direction of the physical resource, whether the physical resource corresponding to the resource identifier or the link identifier is a resource for data sending or a resource for data receiving.

* * * * *